United States Patent [19]
Burgschat et al.

[11] Patent Number: 5,841,134
[45] Date of Patent: Nov. 24, 1998

[54] PHOTO-ELECTRIC DISTANCE- AND ANGLE-MEASUREMENT SYSTEM FOR MEASURING THE DISPLACEMENT OF TWO OBJECTS WITH RESPECT TO EACH OTHER

[75] Inventors: Reiner Burgschat, Jena; Joerg Willhelm, Wetzlar, both of Germany

[73] Assignee: Carl Zeiss Jena GmbH, Jena, Germany

[21] Appl. No.: 809,591

[22] PCT Filed: Jul. 25, 1996

[86] PCT No.: PCT/EP96/03276

§ 371 Date: Mar. 26, 1997

§ 102(e) Date: Mar. 26, 1997

[87] PCT Pub. No.: WO97/05457

PCT Pub. Date: Feb. 13, 1997

[30] Foreign Application Priority Data

Jul. 26, 1995 [DE] Germany .......... 195 27 287.0

[51] Int. Cl.⁶ .................................................. G01B 11/00
[52] U.S. Cl. ........................................ 250/237 G; 356/374
[58] Field of Search ............................ 250/237 G, 208.2, 250/208.3, 206.1, 214 R; 356/356, 374; 341/13

[56] References Cited

U.S. PATENT DOCUMENTS 5,666,196  9/1997  Ishii et al. ........................... 250/237 G Primary Examiner—Edward P. Westin
Assistant Examiner—Kevin Pyo
Attorney, Agent, or Firm—McAulay Nissen Goldberg Kiel & Hand, LLP

[57] ABSTRACT

A photoelectric path- and angle-measurement system for measuring the displacement of two objects relative to one another comprises a quantity $N = n \cdot 4$ of photoreceivers which are arranged in a photoreceiver matrix in such a way that the diagonals of the photoreceivers lie parallel to the diagonals of the photoreceiver matrix and the photoreceivers which detect the same phase position are electrically connected with one another, and these signals are fed to an evaluating circuit.

8 Claims, 1 Drawing Sheet

PHOTO-ELECTRIC DISTANCE- AND ANGLE-MEASUREMENT SYSTEM FOR MEASURING THE DISPLACEMENT OF TWO OBJECTS WITH RESPECT TO EACH OTHER

BACKGROUND OF THE INVENTION

1. Field of the Invention

This application is a 371 of PCT/EP96/03276 Jul. 25, 1996.

The invention is directed to a photoelectric path- and angle-measurement system for measuring the displacement of two objects relative to one another and is suitable for use in path- and angle-measurement systems, for example.

2. Description of the Related Art

Very different constructional types of path- and angle-measurement systems are known from the prior art. In general, these measurement systems have in common that a reference grating divided into a plurality of fields is arranged over the scale or the circular graduation and the rulings in the fields are displaced relative to one another by ¼ or ⅓ of the ruling period in each case. The photoelectric detectors associated with the fields of the reference grating send signals which are phase-shifted by 90° or 120° and which detect the scale displacement or graduated circle rotation as a function of direction in appropriate electronic equipment.

DE-C-3904898 describes an "optical encoder" which uses a noncollimated light source, a reference grating between the light source and scale grating, and a reference grating between photoreceivers and scale grating. The two reference gratings lie in a plane. The reference grating between the photoreceivers and the scale grating is divided into a plurality of fields. The grating rulings in the fields are displaced relative to one another by ¼ of the ruling period in each instance. The photoreceivers associated with the reference fields detect signals with phase positions of 0°, 90°, 180° and 270°.

However, the three-grating encoder described above is sensitive to rotation and changes in the spacing of the measurement head from the scale with respect to the phase position of the receiver signals.

Further, there is a known device for measuring displacement and rotation of a body which uses receiver arrangements in matrix form, wherein the reference grating fields are associated with phase-shifted grating lines and are interconnected statistically to compensate for amplitude errors, phase errors and ruling errors.

This arrangement is particularly suitable for transmitted-light measurement systems with collimated illumination, but has relatively high requirements with respect to manufacturing.

OBJECT AND SUMMARY OF THE INVENTION

Based on the prior art described above, the primary object of the present invention is to provide a photoelectric path- and angle-measurement system for measuring the displacement of two objects relative to one another which is not sensitive to changes in distance and rotations of the measurement head relative to the scale and which at the same time enables a very simple and economical construction.

This object is met, according to the invention, in a generic photoelectric path- and angle-measurement system in that the diagonals of the photoreceivers parallel to the diagonal of the photoreceiver matrix and parallel to the optical fringe patterns, and the diagonals of the photoreceivers which do not detect the same phase position and whose diagonals lie adjacent to the diagonal of the photoreceiver matrix are equispaced with respect to one another, wherein the diagonal of the photoreceivers contains the points forming the critical surface points or centroids, in that, further, the photoreceivers which detect the same phase position are electrically interconnected, and in that these signals are fed to an evaluating circuit.

In accordance with a preferred further development of the photoelectric path- and angle-measurement system according to the invention, the light of the light source impinges on the photoreceiver matrix after it has passed through the reference grating and been reflected by the scale grating and passed through the reference grating a second time.

In another advantageous construction of the invention, the optical fringe patterns are produced by adjusting an angle $\alpha$ between the reference grating and the scale grating, where $\alpha$ is greater than 0° and less than 10°.

The light source is advantageously arranged in the plane of the photoreceivers or placed on the photoreceiver matrix.

Further, it is advantageous that the light source is constructed as an LED.

In another preferred further development, the reference grating has at least twice the number of ruling periods (T) compared with the scale grating.

The solution according to the invention provides the user with a photoelectric path- and angle-measurement system by means of which a simple and economical construction is realized which is at the same time relatively insensitive to changes in distance and rotations of the measurement head relative to the scale.

The invention will be explained more fully in the following with reference to a schematic drawing.

DESCRIPTION OF THE PREFERRED EMBODIMENTS

Figure 1:
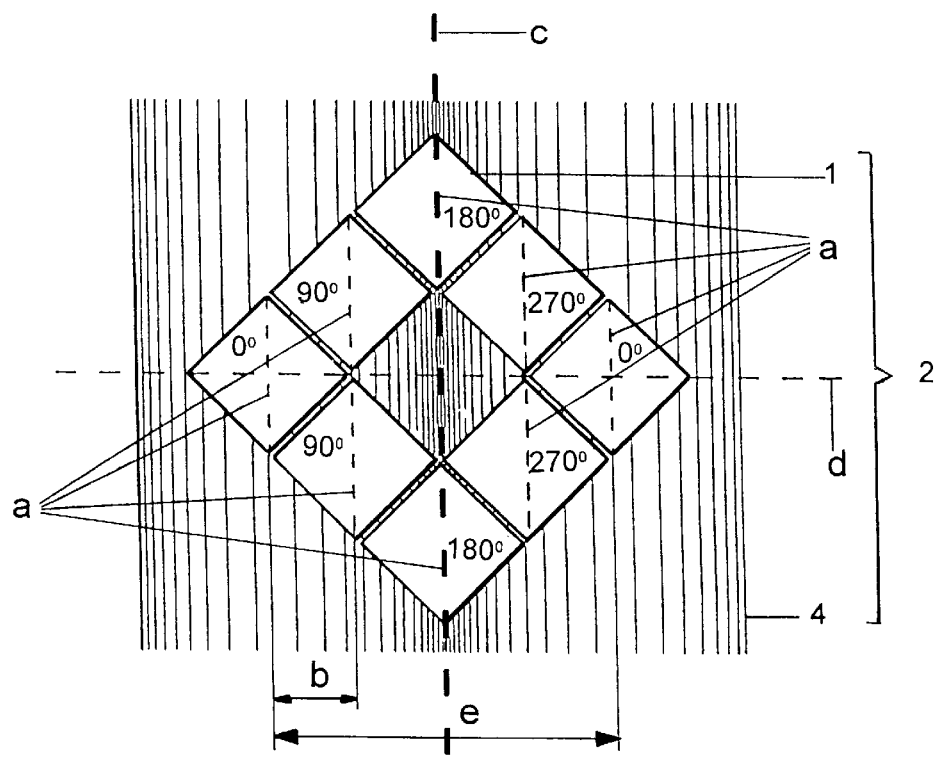
FIG. 1 shows a schematic view of the arrangement according to the invention.

The arrangement shown schematically in FIG. 1 has a photoreceiver matrix 2 formed of a quantity $N=n\cdot4$ of photoreceivers 1 constructed thereon, where N is the quantity of photoreceivers and n is an even number greater than or equal to 2.

However, advantageous arrangements result from the construction of a photoreceiver matrix 2 having 8, 24 or 48 photoreceivers 1.

The photoreceivers 1 are arranged in a checkerboard pattern in a square or rhombus, wherein there are no photoreceivers 1 in the center.

For purposes of illustrating the manner of operation, an optical fringe pattern 4 is deposited (FIG. 1). For example, this is achieved as a moire pattern by rotating the reference grating relative to the scale grating by an angle $\alpha$ in the range of $10°>\alpha>0°$.

The diagonals a of the photoreceivers 1 and the diagonals of the photoreceiver matrix 2 lie parallel to the optical fringe pattern 4.

All photoreceivers 1 with the same shown phase position whose diagonals extend parallel to the reference axis c give a family of parallel lines. These parallel photoreceivers detect signals with +90-degree or −90-degree phase displacement depending upon whether the photoreceivers are at a distance b from the parallels of diagonals a adjoining on the right-hand side or on the left-hand side.

Accordingly, the 90-degree photoreceivers which are responsible for the 90-degree phase position (shown as photoreceivers with 90° are electrically interconnected.

All photoreceivers 1 detecting signals with the same phase are combined in the photoreceiver matrix 2 or in an evaluating circuit and there are thus four signals which are phase-shifted by 90° relative to one another.

The arrangement of the photoreceivers 1 in the photoreceiver matrix 2 always ensures that the same quantity of photoreceivers 1 contributes to the forming of a signal and that the amplitude of the four signals will accordingly be the same. The spacing e of the photoreceivers 1 which detect signals of the same phase position on the orthogonal diagonals (3) relative to the reference axis c of the photoreceiver matrix 2 determine the optical fringe spacing of the moiré patterns or interference fringes.

The above-described arrangement of the photoreceiver matrix has an intensely phase-compensating effect. A rotation of the optical fringe pattern relative to the photoreceiver matrix does not result in a phase change in the signals; rather, only the amplitude of the signals changes. A change in the optical fringe spacing also does not cause any phase errors in the signals, but rather only a change in amplitude.

This is important for interpolation of the signals because, in conventional interpolation methods for increasing resolution in the measurement systems, the changes in amplitude in the signals have only a negligible effect on measurement accuracy, but phase errors and offset errors of the signals cause gross impairment of measurement accuracy.

Figure 2:
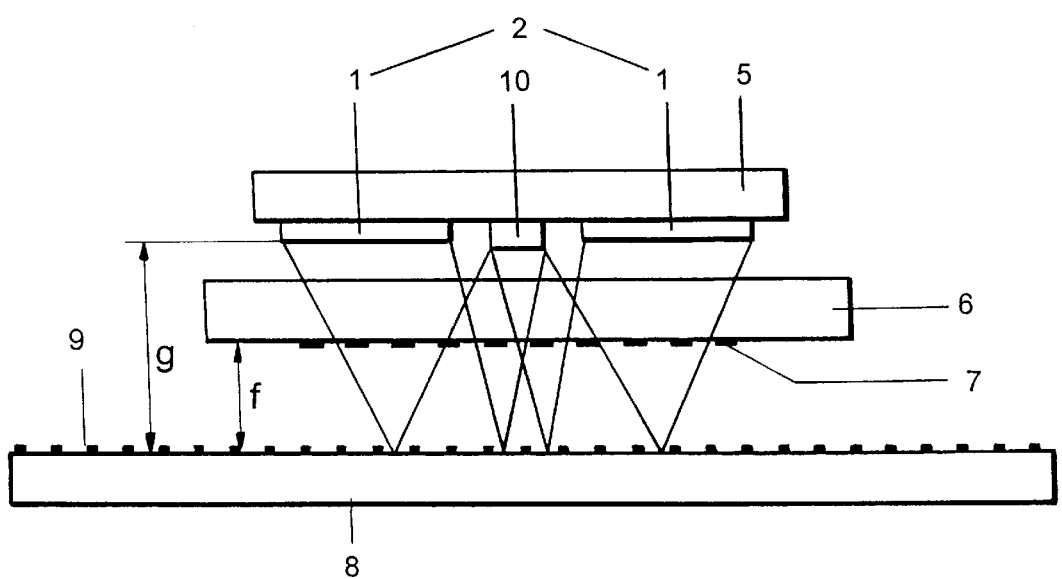
FIG. 2 shows an embodiment form of the construction of the arrangement according to the invention.

FIG. 2 shows a schematic embodiment form of the construction of the photoelectric path- and angle-measurement system according to the invention.

In this sectional view, the photoreceivers 1 of the photoreceiver matrix 2 are arranged in a plane with the light source 10. The light source 10 which is formed, e.g., as an LED emits diffuse light of wavelength λ.

The light of the LED falls upon a reference grating 7 with a grating period or grating constant g 2. The reference grating 7 is located on a substrate 6, e.g., glass. A scale grating 9 which is applied on a scale 8 is arranged at a distance f from this reference grating 7. The scale grating 9 is an amplitude grating or a reflection grating with grating constant g 1.

The distance f is given by the grating constants g 1 and g 2, the light wavelength λ of the light source 10, the photoreceiver spacing e, and the spacing g of the photoreceiver matrix 2 and the light source 10 relative to the scale grating 9 in accordance with the following equation:

$$f = \frac{g1 \cdot g2}{\lambda} \cdot \cos\left(\arctan\frac{e}{4g}\right)$$

The reflected light of the scale grating 9 passes once through the reference grating 7 and impinges on the photoreceiver 1. The reference grating 7 is a smoothly, continuously ruled grating. The grating constant g 2 is preferably greater than grating constant g 1 by a factor of 2 in order to achieve a greater efficiency. The reference grating 7 and the scale grating 9 are rotated by an angle α relative to one another in order to generate an optical fringe pattern 4. The angle a results from the grating constant g 1 and the photoreceiver spacing e according to the following function:

$$\alpha = \arctan\frac{g1}{e}$$

This angle of rotation a can also be taken into account when ruling the reference grating 7.

While the foregoing description and drawings represent the preferred embodiments of the present invention, it will be obvious to those skilled in the art that various changes and modifications may be made therein without departing from the true spirit and scope of the present invention.

What is claimed is:

1. In a photoelectric path- and angle-measurement system for measuring the displacement of two objects relative to one another, having a light source, a reference grating, and a scale grating for generating an optical fringe pattern, having photoreceivers, and having an evaluating circuit, wherein a quantity of photoreceivers corresponding to $N = n \cdot 4$ is provided, where N is the quantity of photoreceivers and n is an even number greater than or equal to 2, and wherein diagonals passing through centroids of all photoreceivers are parallel to one another, and photoreceivers of the same phase position are electrically connected with one another, an improvement comprising:

diagonals extending parallel to one another being arranged parallel to fringes of the optical fringe pattern and, in each instance, passing through the centroids of photoreceivers which detect signals of the same phase position; and wherein every two adjacent diagonals have the same spacing from one another and the photoreceivers associated therewith detect signals which are out of phase by 90° relative to one another.

2. The photoelectric path- and angle-measurement system according to claim 1, wherein the optical fringe pattern is produced by adjusting an angle α between the reference grating and the scale grating, where α is greater than 0° and less than 10°.

3. The photoelectric path- and angle-measurement system according to claim 1, wherein the photoreceivers are arranged in the form of a photoreceiver matrix.

4. The photoelectric path- and angle-measurement system according to claim 3, wherein the light source is arranged in the center of the photoreceiver matrix.

5. The photoelectric path- and angle-measurement system according to claim 1, wherein the light source is arranged in the plane of the photoreceivers.

6. The photoelectric path- and angle-measurement system according to claim 1, wherein the light source is arranged so as to be placed on the photoreceiver matrix.

7. The photoelectric path- and angle-measurement system according to claim 3, wherein the photoreceivers are arranged in the photoreceiver matrix in the form of a square or rhombus, wherein there are no photoreceivers in the center.

8. The photoelectric path- and angle-measurement system according to claim 1, wherein the reference grating has at least twice the number of ruling periods compared with the scale grating.

* * * * *